Patented June 8, 1937

2,082,790

UNITED STATES PATENT OFFICE 2,082,790

PROCESS OF PRODUCING ESTERS OF PHENOLS

Oscar A. Cherry, Chicago, Ill.

No Drawing. Application March 19, 1935, Serial No. 11,843

19 Claims. (Cl. 260—99.40)

This invention relates to a process of producing phenolic esters, and more particularly to a new and improved method for the economical production of esters of various phenols and high-boiling carboxylic acids, whereby these esters are for the first time available commercially in a relatively pure state.

In particular, it refers to a method including the reaction of a high-boiling acid, a phenol, and a low-boiling acid anhydride, to produce the low-boiling acid, which is distilled off, and the desired ester.

In the production of phenyl esters, various methods have been used. With the active low molecular weight acids such as acetic acid, the esters have been prepared by reacting the anhydride directly with the phenol, in the presence of a condensing agent such as caustic soda. The ester is then separated from the reaction mixture by any available method.

As the molecular weight of the acids increases, their reactivity decreases. In the case of the straight chain saturated acids, this is particularly true; and the anhydrides of acids with more than 7 carbon atoms (caprylic acid and higher) will not esterify phenols by a simple direct reaction under normal operating conditions. It is necessary, in such cases, either to react the phenols with the acid chloride, or to react them with the acids in the presence of reagents which will form the acid chlorides in situ (e. g. phosphorous oxychloride, thionyl chloride). In either case, hydrochloric acid is evolved; this acid is extremely corrosive, and must be separated from the reaction mass. Furthermore, the acid chlorides, and the carrying agents, are rather expensive; and the commercial preparation of these esters is therefore not feasible by this method.

It has been proposed to esterify phenols at extremely high temperatures with acid anhydrides; but in addition to the difficulties encountered in the reaction, it is extremely difficult to separate the esters from the free acids liberated.

I have discovered that esters may be prepared by heating a mixture of phenol, a high-boiling, high molecular weight acid, and a low-boiling acid anhydride, subjecting the mixture to distillation and condensing so that low-boiling acid formed by the reaction is allowed to escape, while ester, anhydride, phenol and high-boiling acid are returned to the reaction.

By high-boiling carboxylic acid is meant those carboxylic acids boiling at above 200° centigrade at atmospheric pressure, and in the claims the term "high-boiling" should be so construed. By low-boiling organic acid anhydride is meant those anhydrides which boil at less than 190° centigrade at atmospheric pressure, and in the claims the term "low-boiling" is to be so construed.

For the greatest economy of operation the heat treatment should be carried out under such conditions and in such apparatus as will permit the ready escape of the acid from which the low-boiling anhydride is derived, and which will inhibit or prevent the escape of the low-boiling anhydride.

Specific examples will be given to show more clearly how the invention may be practiced. However, the examples are to be considered in a purely illustrative sense and not in a limiting one. The scope of the invention is shown by the appended claims.

Example 1

In a flask equipped with a fractionating column is charged 690 parts of a cresylic acid fraction boiling between 202 and 208° centigrade, 1707 parts of stearic acid and 666 parts of acetic anhydride of from 92 to 95% assay. The mixture is then heat treated in such a manner and at such a rate that acetic acid escapes from the top of the fractionating column and acetic anhydride and/or phenols are condensed and returned to the reaction flask. The reaction is complete when acetic acid corresponding to the amount to be derived by hydration of the acetic anhydride has been distilled. In order to distill this amount of acid it may be necessary to raise the temperature of the contents of the reaction flask finally to 300° centigrade. The acetic acid distilling is of high purity and may be recovered and utilized for the preparation of fresh quantities of anhydride.

It will be noted that the phenol and the high-boiling acid are used in equi-molecular proportions and that the acetic anhydride is used in equi-molecular proportion to the acid.

If desired, the phenol may be used in slight excess and the excess subsequently removed from the ester by vacuum distillation. Or, if a small amount of free acid is not detrimental to the purpose for which the ester is to be used, a slight excess of high-boiling acid may be used. A deficiency of acetic anhydride results in the presence of both free phenol and free acid in the ester. An excess of acetic anhydride does no harm but is unnecessary and uneconomical.

Example 2

Ninety-four parts of phenol, 282 parts of oleic acid and 110 parts of 92% acetic anhydride are treated as described in Example 1.

Example 3

Beta-naphthyl abietate is made by reacting a mixture of 144 parts beta-naphthol, 288 parts of abietic acid and 110 parts 92% acetic anhydride. If rosin is substituted for the abietic acid about 340 parts of rosin should be used.

In all cases it is difficult to completely free the phenyl ester from traces of acetic acid by distillation at atmospheric pressure. This impurity may be removed by washing with water but more simply by subjecting the product to reduced pressure after the reaction has been completed.

Example 4

In a flask equipped with a 2-bulb distilling tube containing a few glass beads were heated 140 grams of propionic anhydride, 130 grams of a cresylic acid fraction boiling between 207° and 215° centigrade and consisting largely of low-boiling xylenols, and 280 grams of fatty acids derived from linseed oil. The heating was conducted at such a rate that propionic acid was distilled substantially as fast as formed and at such a rate that practically no propionic anhydride was distilled. A thermometer was immersed in the liquid and the heating was continued until a temperature of 290° centigrade was reached. The distillate collected at this time weighed 137 grams. The 2-bulb distilling tube was then replaced by a short bent tube and the mixture was heated under a vacuum of about 20 mm. of mercury so that there was practically no refluxing of the escaping vapors. This vacuum was maintained while the temperature of the liquid was being raised from 210° to 230° centigrade. The resulting ester was an amber colored liquid possessing drying properties. It had, without purification, an acid number of 28.2.

Example 5

In a manner similar to that above described, 250 grams of the cresylic acid fraction above described, 560 grams of fatty acids derived from soya bean oil and 275 grams of propionic anhydride were distilled to produce a xylenyl-soya bean fatty acid ester having an acid number of 29.2 and contained substantially no free xylenol.

Example 6

In a similar manner 49 grams of this cresylic acid fraction was heat treated with 42 grams of commercial acetic anhydride, and 55 grams of n-caprylic acid to form xylenyl n-caprylate. The ester as produced had an acid number of 19.4. In this case a more efficient fractionating column was used to prevent the distillation of acetic anhydride.

Example 7

Similarly 110 grams of technical resorcinol was heat treated with 280 grams of linseed fatty acids and 105 grams of acetic anhydride to form an ester possessing the property of drying in the presence of air. It will be noted that in this case only one-half of the phenolic hydroxyl groups were esterfied and that the product is, therefore, largely the mono-ester.

Example 8

Similarly 105 grams of U. S. phenol, 200 grams of lauric acid and 115 grams of acetic anhydride were heat treated with distillation of acetic acid to form phenyl laurate, which, without further purification had an acid number of 8.85.

Where phenol itself is used as the phenolic constituent, the acid anhydride must be so chosen that the acid formed boils sufficiently below the boiling point of phenol (181° centigrade) to get a clean separation.

In my co-pending application Serial #749,991, filed October 25, 1934, I have disclosed the use of this process for preparing the esters of phenolic resins.

Variations in my process will occur to those skilled in the art to which this invention appertains. Thus other carboxylic acids boiling above 200° centigrade may be used, such as benzoic acid and the like; and other phenols or low-boiling organic anhydrides, such as chloroacetic anhydride, may likewise be used. Therefore, the claims should be construed as broadly as the prior art permits.

In the appended claims the term "phenyl ester" is used to designate not only the esters of phenol itself but broadly to include all phenols. The term "high-boiling carboxylic acid" includes single acids, or mixed acids, such as are obtained by the saponification of fatty oils, a mixed ester, or mixture of esters, resulting in such case. The term "heat treating" in the claims, is defined as heating under such conditions that the low-boiling acid derived from the anhydride is removed from the reaction, while the original reactants are returned thereto.

What I claim is:

1. The process of producing a phenyl ester comprising heating a mixture of a phenol, a carboxylic acid boiling above 200° C. and an organic acid anhydride boiling below 190° C., to a temperature above the boiling point of the acid corresponding to the anhydride.

2. The process of claim 1 in which the acid and anhydride are present in substantially equimolecular proportions.

3. The process of claim 1, in which the three components are present in substantially equimolecular proportions.

4. The process of producing a phenyl ester comprising heating a mixture of a phenol, rosin and an organic acid anhydride boiling below 190° C., to a temperature above the boiling point of the acid corresponding to the anhydride.

5. The process of producing a phenyl ester comprising heating a mixture of a phenol, rosin and acetic anhydride to a temperature above the boiling point of acetic acid.

6. The process of producing a phenyl ester comprising heating a mixture of a phenol, stearic acid and an organic acid anhydride boiling below 190° C., to a temperature above the boiling point of the acid corresponding to the anhydride, the three components of the mixture being present in substantially equimolecular proportions.

7. The process of producing a phenyl ester comprising heating a mixture of a phenol, stearic acid and acetic anhydride to a temperature above the boiling point of acetic acid, the three components of the mixture being present in substantially equimolecular proportions.

8. The process of producing phenyl esters comprising distilling from a mixture of a carboxylic acid boiling above 200° C. and an organic acid anhydride boiling below 190° C., the acid from which the acid anhydride is derived.

9. The process of claim 8 in which the products are present in substantially equimolecular proportions.

10. The process of producing a phenyl ester comprising distilling acetic acid from a substantially equi-molecular mixture of cresols, stearic acid and acetic anhydride.

11. The process of producing phenyl esters which comprises distilling acetic acid from a substantially equimolecular mixture of a phenol, acetic anhydride and a carboxylic acid boiling above 200° C.

12. The process of producing phenyl esters comprising the step of distilling acetic acid from a mixture of a phenol, a carboxylic acid boiling above 200° C., and acetic anhydride and continuing the distillation until substantially complete esterification of the phenol has occurred.

13. The process of producing a phenyl ester comprising distilling substantially two molecular proportions of acetic acid from a mixture of one molecular proportion of phenol, one molecular proportion of stearic acid and one molecular proportion of acetic anhydride.

14. The process of producing a phenyl ester which comprises heating a mixture of a phenol, a carboxylic acid boiling above 200° C., and an acid anhydride chosen from the group consisting of acetic anhydride, propionic anhydride and chloroacetic anhydride, to a temperature above the boiling point of the acid corresponding to the anhydride.

15. The process of claim 14, in which the acid and anhydride are present in substantially equimolecular proportions.

16. The process of claim 14, in which the acid and anhydride are present in substantially equimolecular proportions, and the phenol is present in an amount sufficient to combine substantially completely with the acid boiling above 200° C.

17. The process of esterifying phenolic hydroxyl groups comprising heating a mixture of a compound containing phenolic hydroxyls, a carboxylic acid boiling above 200° C., and an organic acid anhydride boiling below 190° C., to a temperature above the boiling point of the acid corresponding to the anhydride.

18. The process of claim 17 in which the acid and anhydride are present in substantially equimolecular proportions.

19. The process of esterifying phenolic hydroxyl groups comprising heating a mixture of a compound containing phenolic hydroxyls, a carboxylic acid boiling above 200° C. and an anhydride chosen from the group consisting of acetic anhydride, propionic anhydride and chloroacetic anhydride, to a temperature above the boiling point of the acid corresponding to the anhydride.

OSCAR A. CHERRY.